US012806557B2

(12) United States Patent
Jeong et al.

(10) Patent No.: US 12,806,557 B2
(45) Date of Patent: Nov. 24, 2026

(54) AIR PURIFIER

(71) Applicant: Samsung Electronics Co., Ltd., Suwon-si (KR)

(72) Inventors: Joonseon Jeong, Suwon-si (KR); Dongjin Lee, Suwon-si (KR); Jaiyoung Chung, Suwon-si (KR); Hyun Chul Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 310 days.

(21) Appl. No.: 18/637,674

(22) Filed: Apr. 17, 2024

(65) Prior Publication Data

US 2025/0170515 A1 May 29, 2025

(30) Foreign Application Priority Data

Nov. 27, 2023 (KR) ........................ 10-2023-0167149

(51) Int. Cl.

| | |
|---|---|
| ***B01D 47/06*** | (2006.01) |
| ***B01D 45/08*** | (2006.01) |
| ***B01D 46/10*** | (2006.01) |
| ***B01D 46/30*** | (2006.01) |
| ***B01D 47/04*** | (2006.01) |
| ***B01D 50/60*** | (2022.01) |

(Continued)

(52) U.S. Cl.

CPC ........... *B01D 47/066* (2013.01); *B01D 46/10* (2013.01); *B01D 46/30* (2013.01); *B01D 47/04* (2013.01); *B01D 47/06* (2013.01); *B01D 50/60* (2022.01); *B01D 53/32* (2013.01); *B01D 53/78* (2013.01); *B01D 39/2051* (2013.01); *B01D 45/08* (2013.01); *B01D 2257/708* (2013.01); *B01D 2258/06* (2013.01); *B01D 2259/816* (2013.01); *B01D 2259/818* (2013.01); *B05B 17/06* (2013.01)

(58) Field of Classification Search

None

See application file for complete search history.

(56) References Cited

U.S. PATENT DOCUMENTS

| | | | |
|---|---|---|---|
| 5,076,819 | A | 12/1991 | Sharrow |
| 6,368,386 | B1 | 4/2002 | Nelson et al. |

(Continued)

FOREIGN PATENT DOCUMENTS

| | | | |
|---|---|---|---|
| CN | 104815495 | A * | 8/2015 |
| CN | 107327935 | A | 11/2017 |

(Continued)

OTHER PUBLICATIONS

CN110252056A_ENG (Espacenet machine translation of Yang) (Year: 2019).*

(Continued)

*Primary Examiner* — Gabriel E Gitman

(74) *Attorney, Agent, or Firm* — CANTOR COLBURN LLP

(57) ABSTRACT

An air purifier includes an ultrasonic droplet sprayer which forms a gas-liquid mixed fluid by spraying fine droplets into a duct by using an ultrasonic vibrator, and a dust collector which collects fine dust from the gas-liquid mixed fluid. The dust collector includes a gas-liquid contact layer having a plurality of pores through which the gas-liquid mixed fluid passes.

18 Claims, 8 Drawing Sheets

(51) Int. Cl.

| | |
|---|---|
| ***B01D 53/32*** | (2006.01) |
| ***B01D 53/78*** | (2006.01) |
| *B01D 39/20* | (2006.01) |
| *B05B 17/06* | (2006.01) |

(56) References Cited

U.S. PATENT DOCUMENTS

| | | | | |
|---|---|---|---|---|
| 6,627,166 | B1 * | 9/2003 | Simon | B01D 50/20 422/123 |
| 8,353,409 | B2 | 1/2013 | Murayama et al. | |
| 8,702,850 | B2 | 4/2014 | Suzuki et al. | |
| 9,346,060 | B2 | 5/2016 | Zhou | |
| 11,292,011 | B2 | 4/2022 | Hosseinifar et al. | |
| 2017/0028095 | A1 | 2/2017 | Ohyama et al. | |
| 2018/0353901 | A1 * | 12/2018 | Davis | B01D 53/79 |
| 2021/0231324 | A1 | 7/2021 | Park et al. | |
| 2021/0322917 | A1 | 10/2021 | Jeong et al. | |
| 2022/0126234 | A1 * | 4/2022 | Jeong | B01D 47/06 |
| 2022/0370937 | A1 | 11/2022 | Choi et al. | |
| 2023/0151983 | A1 * | 5/2023 | Jeong | B01D 45/12 95/149 |
| 2023/0219035 | A1 | 7/2023 | Kim et al. | |
| 2023/0330580 | A1 * | 10/2023 | Fernandino | B01D 46/0031 |
| 2024/0216858 | A1 | 7/2024 | Chung et al. | |
| 2024/0263813 | A1 | 8/2024 | Kim et al. | |
| 2025/0177915 | A1 | 6/2025 | Chung et al. | |

FOREIGN PATENT DOCUMENTS

| | | | | | |
|---|---|---|---|---|---|
| CN | 110252056 | A | * | 9/2019 | B05B 17/06 |
| CN | 109059125 | B | | 8/2020 | |
| DE | 202010015267 | U1 | * | 4/2011 | B01D 47/06 |
| JP | 2009058160 | A | | 3/2009 | |
| KR | 105547936 | A | | 5/2016 | |
| KR | 20180128792 | A | * | 12/2018 | B05B 17/06 |
| KR | 1020210097030 | A | | 8/2021 | |
| KR | 1020210128270 | A | | 10/2021 | |
| KR | 1020220056021 | A | | 5/2022 | |
| KR | 1020220158602 | A | | 12/2022 | |
| KR | 1020230070971 | A | | 5/2023 | |
| KR | 1020230108638 | A | | 7/2023 | |
| KR | 1020240106772 | A | | 7/2024 | |
| KR | 1020240123139 | A | | 8/2024 | |

OTHER PUBLICATIONS

CN104815495A_ENG (Espacenet machine translation of Huang) (Year: 2015).*

DE202010015267U1_ENG (Espacenet machine translation of Big Dutchman Int GMBH) (Year: 2011).*

KR20180128792A_ENG (Espacenet machine translation of Byun) (Year: 2018).*

* cited by examiner

AIR PURIFIER

CROSS-REFERENCE TO RELATED APPLICATION

This application claims priority to Korean Patent Application No. 10-2023-0167149, filed on Nov. 27, 2023, and all the benefits accruing therefrom under 35 U.S.C. § 119, the content of which in its entirety is herein incorporated by reference.

BACKGROUND

1. Field

The disclosure relates to an air purifier for removing pollutants from a gas.

2. Description of the Related Art

Air purifiers may purify air by collecting or decomposing pollutants including fine dust in a gas, for example, air. Air purifiers may be applied to industrial dust collection equipment, air conditioning/ventilation systems in buildings, or the like.

A filtering method is typically used for removing fine dust from air. In the filtering method, fine dust is collected from air by using a filter. The filtering method has high dust removal efficiency and may filter various types of dust from air. When the amount of fine dust collected by a filter increases, the performance of the filter may degrade, and a pressure drop due to the filter may increase. Accordingly, a filter may be periodically managed or replaced.

SUMMARY

Provided is an air purifier which may reduce water consumption.

Provided is an air purifier which may reduce energy consumption.

Additional aspects will be set forth in part in the description which follows and, in part, will be apparent from the description, or may be learned by practice of the presented embodiments.

According to an embodiment of the disclosure, an air purifier includes a duct through which air including fine dust flows, an ultrasonic droplet sprayer which sprays fine droplets into the duct by using an ultrasonic vibrator to form a gas-liquid mixed fluid including the fine dust, and a dust collector which collects the fine dust in the gas-liquid mixed fluid including, where the dust collector includes a gas-liquid contact layer having a plurality of pores through the gas-liquid mixed fluid passes.

In an embodiment, a size of each of the fine droplets may be about 50 micrometers (μm) or less.

In an embodiment, a droplet spraying rate of the ultrasonic droplet sprayer may satisfy a liquid-to-gas ratio in a range of about 0.01 liter per cubic meter ($L/m^3$) to about 0.1 $L/m^3$.

In an embodiment, a size of each of the plurality of pores may be in a range of about 50 pores per inch (ppi) to about 80 ppi.

In an embodiment, a thickness of the gas-liquid contact layer may be in a range of about 6 millimeters (mm) to about 8 mm.

In an embodiment, the gas-liquid contact layer may include a porous foam member. In such an embodiment, the size of each of the plurality of pores may be in a range of about 50 ppi to about 80 ppi. In such an embodiment, the thickness of the porous foam member may be in a range of about 6 mm to about 8 mm. In such an embodiment, the porous foam member may be hydrophobically treated.

In an embodiment, the gas-liquid contact layer may include a housing and a plurality of filling particles filled in the housing. In such an embodiment, the plurality of filling particles may be hydrophobically treated. In such an embodiment, the housing may be provided with an inlet through which the gas-liquid mixed fluid is introduced and an outlet through which the gas-liquid mixed fluid is discharged. In such an embodiment, a mesh screen may be arranged in each of the inlet and the outlet. In such an embodiment, the mesh screen may be hydrophobically treated.

In an embodiment, the air purifier may further include a gas removal portion arranged in an upstream side of the ultrasonic droplet sprayer, where the gas removal portion may remove gaseous pollutants from air.

According to another embodiment of the disclosure, an air purifier includes a duct through which air including pollutants flows, an ultrasonic droplet sprayer which sprays fine droplets into the duct by using an ultrasonic vibrator to form a gas-liquid mixed fluid including the pollutants, and a porous foam member having a plurality of pores through which the gas-liquid mixed fluid passes, where a liquid film is formed on a collection surface defined by the plurality of pores to collect the pollutants in the gas-liquid mixed fluid.

In an embodiment, a droplet spraying rate of the ultrasonic droplet sprayer may satisfy a liquid-to-gas ratio in a range of about 0.01 $L/m^3$ to about 0.1 $L/m^3$.

In an embodiment, a size of each of the plurality of pores may be in a range of about 50 ppi to about 80 ppi.

In an embodiment, a thickness of the porous foam member may be in a range of about 6 mm to about 8 mm.

In an embodiment, the porous foam member may be hydrophobically treated.

In an embodiment, the air purifier may further include a gas removal portion arranged in an upstream side of the ultrasonic droplet sprayer, where the gas removal portion may remove gaseous pollutants from air.

BRIEF DESCRIPTION OF THE DRAWINGS

The above and other features of embodiments will become more apparent by describing in further detail embodiments thereof with reference to the accompanying drawings, in which.

DETAILED DESCRIPTION

Figure 1:
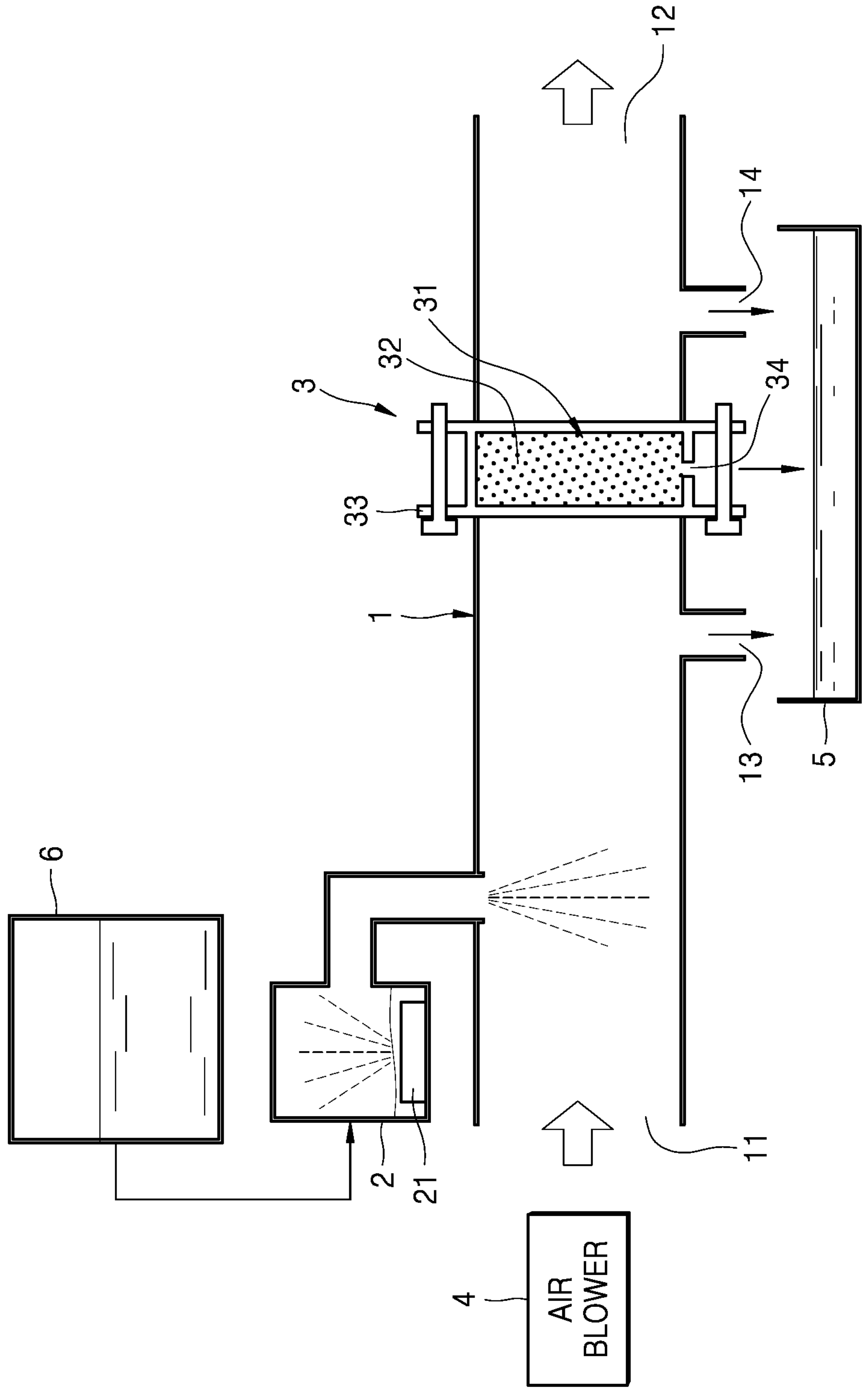
FIG. 1 is a schematic configuration view of an air purifier according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Air purifiers according to embodiments of the disclosure are described below in detail with reference to the accompanying drawings. Throughout the drawings, like reference numerals denote like elements, and sizes of components in the drawings may be exaggerated for convenience of explanation and clarity.

When a constituent element is disposed "above" or "on" to another constituent element, the constituent element may include not only an element directly contacting on the upper/lower/left/right sides of the other constituent element, but also an element disposed above/under/left/right the other constituent element in a non-contact manner.

Terms such as "first" and "second" are used herein merely to describe a variety of constituent elements, but the constituent elements are not limited by the terms. Such terms are used only for the purpose of distinguishing one constituent element from another constituent element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, terms such as ". . . portion," ". . . module," and the like stated in the specification may signify a unit to process at least one function or operation and the unit may be embodied by hardware, software, or a combination of hardware and software.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The operations of all methods described herein can be performed in any suitable order unless otherwise indicated herein or otherwise clearly contradicted by context. Furthermore, the use of any and all examples, or language (e.g., "such as") provided herein, is intended merely to better illuminate the disclosure and does not pose a limitation on the scope of the disclosure unless otherwise claimed.

FIG. 1 is a schematic configuration view of an air purifier according to an embodiment.

Referring to FIG. 1, an embodiment of the air purifier may include a duct 1 through which air to be purified flows, an ultrasonic droplet sprayer 2 which sprays fine droplets into the duct 1 to form a gas-liquid mixed fluid, and a dust collector 3 including a porous gas-liquid contact layer 31 which collects pollutants (e.g., fine dust) from the air, where a plurality of pores 32, through which the gas-liquid mixed fluid passes, is defined in the porous gas-liquid contact layer 31. The air to be purified may include pollutants. The pollutants may include particulate pollutants and gaseous pollutants. The dust collector 3 may remove mainly particulate pollutants and partially gaseous pollutants that are soluble. The particulate pollutants are referred to as fine dust below.

The duct 1 may form an air flow path. The shape of the duct 1 is not particularly limited. For example, the duct 1 may have various cross-sectional shapes, such as a circular shape, a polygonal shape, or the like. In an embodiment, for example, the cross-sectional shape of the duct 1 is a quadrangle. In an embodiment, for example, air including pollutants, for example, fine dust, may be supplied by an air blower 4 to the duct 1 through an inlet 11 thereof. The fine dust may include small fine dust with a diameter of about 10 micrometers (μm) or less. The fine dust may include ultrafine dust with a diameter of about 2.5 μm or less. The air moves along the air flow path formed by the duct 1 and is discharged from the duct 1 through an outlet 12 thereof.

The ultrasonic droplet sprayer 2 may spray fine droplets, for example, water, into the duct 1. The ultrasonic droplet sprayer 2 may include an ultrasonic vibrator 21. In an embodiment, for example, water contained in a water tank 6 may be supplied to the ultrasonic droplet sprayer 2. The water changes into fine droplets due to the vibration energy of the ultrasonic vibrator 21 and is supplied into the duct 1. A gas-liquid mixed fluid, in which air and fine droplets are mixed, is formed within the duct 1. In this process, a portion of the fine dust included in the air is collected by the fine droplets to be coarse. The gas-liquid mixed fluid flows from the inlet 11 toward the outlet 12 along the duct 1.

The dust collector 3 may include the gas-liquid contact layer 31. The gas-liquid contact layer 31 may include the pores 32. The pores 32 form a collection surface in the gas-liquid contact layer 31. The gas-liquid contact layer 31 may be packaged in a housing 33. The pores 32 form a fine flow path through which the gas-liquid mixed fluid passes. In an embodiment, for example, the gas-liquid mixed fluid passes the gas-liquid contact layer 31 through the pores 32. The fine dust that is collected by the fine droplets and becomes coarse, while passing through the pores 32, collides with the collection surface and adhere thereto. Some of the fine droplets that do not include the fine dust collide with the collection surface and adhere thereto. A liquid film is formed on the collection surface due to the fine droplets. While passing through the pores 32, the fine dust that is not collected by the fine droplets contacts the liquid film formed on the collection surface and is collected in the liquid film. A liquid forming the liquid film flows downward along the collection surface due to, for example, the gravity. The housing 33 may be provided with a discharge outlet 34 through which the liquid flowing downward along the collection surface is discharged. The fine dust collected in the droplets is discharged with the liquid from the housing 33 through the discharge outlet 34. The fine flow path may not extend straight in an air flow direction. As the fine flow path becomes more winding, a contact area between the collection surface of the fine flow path and the droplet increases, and thus, the droplet may be more easily or effectively collected in the collection surface of the fine flow path.

In an embodiment, at least one of discharge outlets 13 and 14 may be provided in the duct 1. When the gas-liquid mixed fluid collides with an inner wall of the duct 1, a liquid film is formed on the inner wall of the duct 1 and the fine dust may be collected in the liquid film. The liquid film flows downward along the inner wall of the duct 1 in a direction of gravity, and may be discharged out of the duct 1 through the discharge outlets 13 and 14. In an embodiment, for example, the discharge outlet 13 may be arranged between the ultrasonic droplet sprayer 2 and the dust collector 3. The discharge outlet 14 may be located in the downstream side of the dust collector 3. The liquid discharged through the discharge outlets 13 and 14, and the discharge outlet 34 of the dust collector 3 may be accommodated in a collection tank 5.

In a system for removing fine dust by using the dust collector 3 that is of a wet type, the size of a fine droplet may have a significant effect on the performance of the system, for example, a differential pressure, a fine dust removal rate, and the like. In such a system, the fine dust removal rate increases as a difference between the size of a fine dust to be removed and the size of a fine droplet decreases. In general, considering that the size of a fine dust to be removed is about 10 μm or less, the size of a fine droplet may be about 50 μm or less. Spraying fine droplets as small as possible may be desirable in terms of fine dust removal rate, but if the size of the fine droplets is too small, the fine droplets may evaporate and the proportion of fine droplets used as an effective collecting liquid may be lowered. The minimum size of a fine droplet may be determined considering the size of a fine dust to be removed within a range of about 50 μm or less.

In a case of using hydraulic nozzles, the size of a droplet may be about 100 μm or more so that dust removing performance may be low and water consumption may also be large. Furthermore, in the case of using an air atomizing nozzle that simultaneously sprays compression air and water through a nozzle, high-pressure air is used to reduce the size of a droplet to 50 μm or less, which consumes a lot of energy.

According to embodiments of the disclosure, the ultrasonic droplet sprayer 2 is employed as a droplet spray device. The ultrasonic droplet sprayer 2 makes water into fine droplets using the vibration energy of the ultrasonic vibrator 21. The size of a fine droplet formed by the ultrasonic droplet sprayer 2 is about 10 μm, and the ultrasonic droplet sprayer 2 provides very high uniformity in the size of a fine droplet which is suitable for removing the fine dust. Furthermore, the ultrasonic droplet sprayer 2 consumes less energy than the hydraulic nozzle or the air atomizing nozzle for forming fine droplets. Accordingly, the energy efficiency of an air purifier may be improved.

A pressure drop occurs while the gas-liquid mixed fluid passes through the dust collector 3. A pressure drop amount corresponds to a difference between the pressure in the upstream side of the dust collector 3 and the pressure in the downstream side of the dust collector 3, which may be referred to as a differential pressure. When the differential pressure increases, the energy efficiency of an air purifier is lowered, and operating costs increase. The liquid film formed in the collection surface of the fine flow path may narrows the cross-sectional area of the fine flow path, which causes an increase in the differential pressure. As an amount of sprayed droplets used for air purification increases, a differential pressure that is a pressure difference before and after the dust collector 3 may increase. As the differential pressure decreases, the energy efficiency of an air purifier increases.

In an embodiment, as the ultrasonic droplet sprayer 2 may form a fine droplet of a uniform size of about 10 μm, as described above, a high fine dust removal rate may be obtained with a less droplet spraying rate. Accordingly, a high fine dust removal rate may be obtained even with a relatively small droplet spraying rate of the ultrasonic droplet sprayer 2. In an embodiment, for example, a droplet spraying rate may satisfy a liquid-to-gas ratio in a range of about 0.01 liter per cubic meter ($L/m^3$) to 0.1 $L/m^3$. Accordingly, the fine dust may be removed with high efficiency while decreasing the differential pressure. Such a liquid-to-gas ratio of the ultrasonic droplet sprayer 2 amounts to a level of about 1/30-1/50 of a liquid-to-gas ratio of a hydraulic nozzle or an air atomizing nozzle that is about 0.5 $L/m^3$ to about 3 $L/m^3$, and the fine dust may be removed with high efficiency by using a relatively small amount of water by employing the ultrasonic droplet sprayer 2. Furthermore, as a small amount of water is used, the liquid collecting the fine dust is easily separated from the collection surface of the fine flow path, and thus, differently from a conventional filtering method, even when the dust collector 3 is used for a long time, the fine flow path is not easily clogged. Accordingly, the periodic management or replacement burden of the dust collector 3 may be reduced. In some cases, there may be no need to replace the dust collector 3.

The structure of the gas-liquid contact layer 31 forming the fine flow path is not particularly limited. In an embodiment, the gas-liquid contact layer 31 may include a porous foam member.

Figure 2:
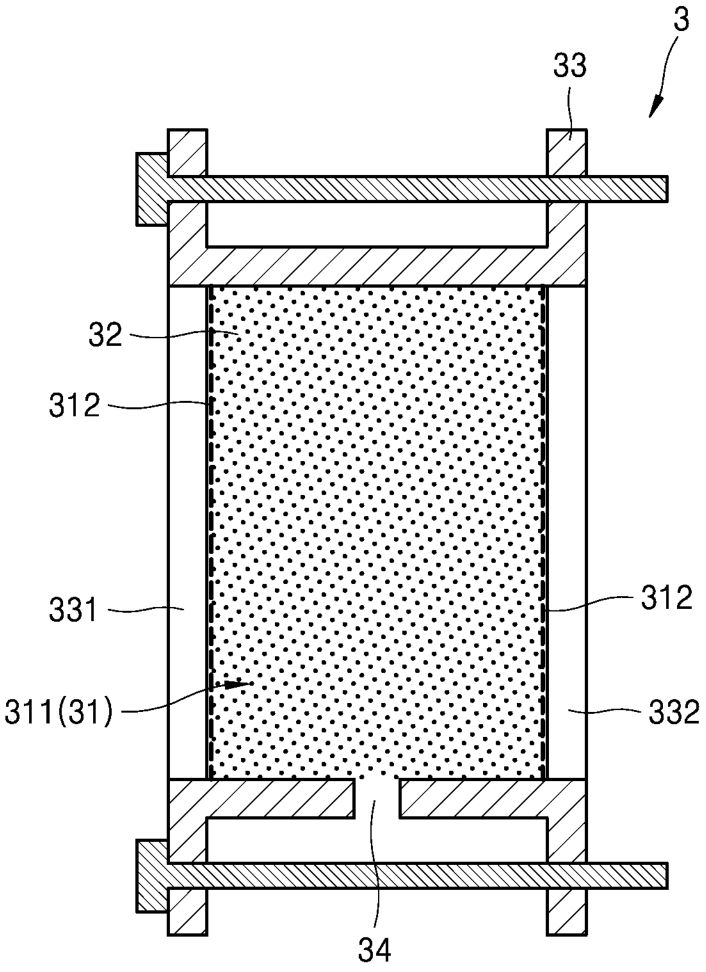
FIG. 2 illustrates a dust collector according to an embodiment.

FIG. 2 illustrates an embodiment of the dust collector 3. Referring to FIG. 2, the gas-liquid contact layer 31 may include a porous foam member 311 having the pores 32. The porous foam member 311 may include, for example, a metal foam block, such as a nickel foam block. The porous foam member 311 may be, for example, accommodated in the housing 33. The housing 33 may include an inlet 331 and an outlet 332 which are opened in a flow direction of the gas-liquid mixed fluid. The gas-liquid mixed fluid that is introduced into the housing 33 through the inlet 331 passes through the fine flow path formed by the pores 32 of the porous foam member 311 and is discharged through the outlet 332. In this process, a liquid film is formed on the collection surface of the fine flow path, and fine dust and droplets including the fine dust are collected by the liquid film. The droplets fall in the direction of gravity and are discharged through the discharge outlet 34.

Figure 3:
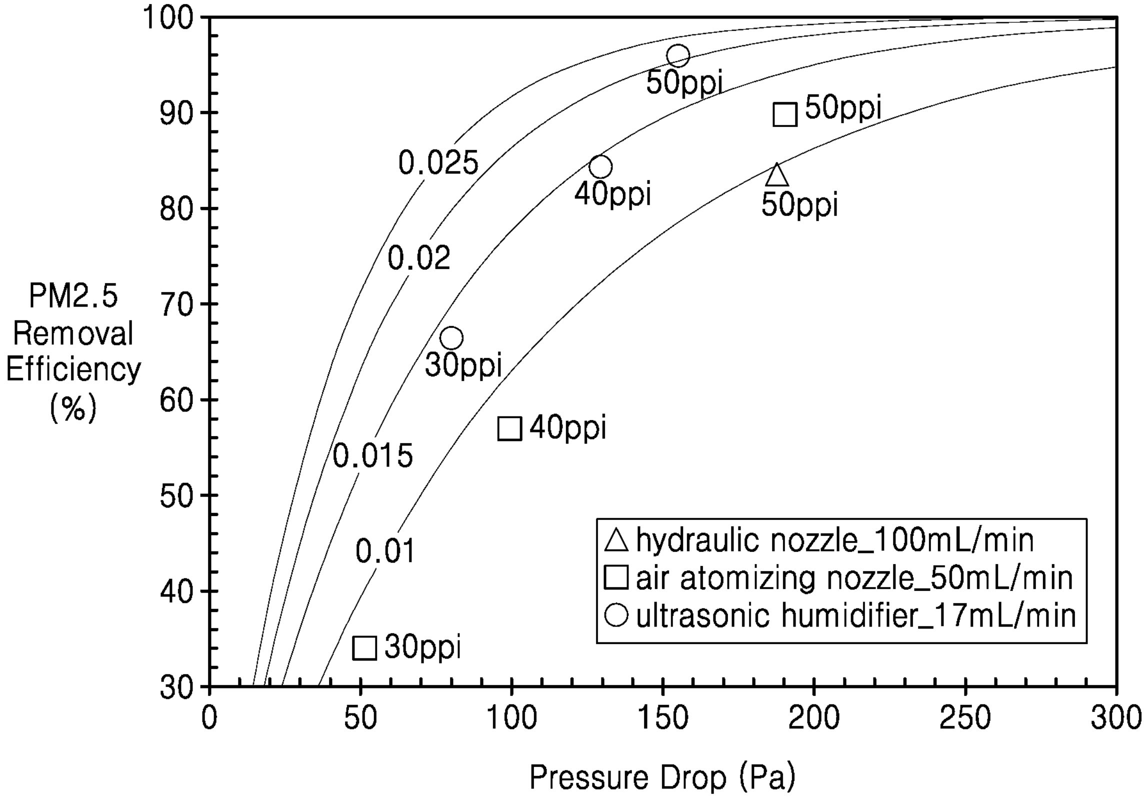
FIG. 3 is a graph showing a measurement results for a fine dust removal rate and a differential pressure according to various types of droplet sprayers.

FIG. 3 is a graph showing measurement results for a fine dust removal rate and a differential pressure according to various types of droplet sprayers. For measurement, a nickel foam block having a thickness of 6 millimeters (mm) and a pore size (or cell density) in a range of 30 pores per inch (ppi) to 50 ppi may be installed, as the gas-liquid contact layer 31, in the duct 1 having a cross-sectional size of 10 centimeters (cm)×10 cm. Each of a hydraulic nozzle, an air atomizing nozzle, and the ultrasonic droplet sprayer 2 is employed as a droplet sprayer. The droplet spraying rate of a hydraulic nozzle is 100 milliliter per minute (mL/min), the droplet spraying rate of an air atomizing nozzle is 50 mL/min, and the droplet spraying rate of the ultrasonic droplet sprayer 2 is 17 mL/min. The fine dust removal rate is calculated by measuring a particle concentration in each of the upstream and the downstream of the gas-liquid contact layer 31 while supplying air including potassium chloride particles of PM2.5 (particles less than 2.5 μm in diameter), as the fine dust, to the duct 1 at a speed of 2.5 meter per second (m/s). In FIG. 3, four curves are curves connecting points indicating the same quality factor (QF), and the number marked on each curve denotes QF. Assuming that the fine dust removal rate is E and the differential pressure is ΔP, QF may be calculated by Equation 1 below. A high QF denotes that fine dust can be effectively removed with small energy.

$$QF = -\text{Ln}\frac{(1-E)}{\Delta P} \quad \text{[Equation 1]}$$

Referring to FIG. 3, when the differential pressure is identical, a case of employing the ultrasonic droplet sprayer 2 shows a higher fine dust removal rate than a case of employing a hydraulic nozzle or an air atomizing nozzle. When the fine dust removal rate is identical, a case of employing the ultrasonic droplet sprayer 2 shows a lower differential pressure than a case of employing a hydraulic nozzle or an air atomizing nozzle. In other words, when QF in the case of employing the ultrasonic droplet sprayer 2 is $QF_{ultrasonic}$, QF in the case of employing an air atomizing nozzle is $QF_{air}$ atomizing, and QF in the case of employing a hydraulic nozzle is $QF_{hydraulic}$, it is satisfied the following inequality: $QF_{ultrasonic} > QF_{air\ atomizing} > QF_{hydraulic}$. Accordingly, in an embodiment, by employing the ultrasonic droplet sprayer 2, fine dust may be efficiently removed with less energy. Furthermore, in an experiment, a liquid-to-gas ratio of the ultrasonic droplet sprayer 2 is about 0.0113, which amounts to merely about 1/5 of that of a hydraulic nozzle and about 1/3 of that of an air atomizing nozzle, but the ultrasonic droplet sprayer 2 exhibits high fine duct removal efficiency and high differential pressure performance. In a case where the ultrasonic droplet sprayer 2 is employed, compared with a case of employing a hydraulic nozzle or an air atomizing nozzle, while less water is consumed, a higher fine dust removal rate and a more excellent differential pressure performance may be obtained. Such a result is due to the forming, by the ultrasonic droplet sprayer 2, of fine droplets having a uniform size of about 10 μm.

Figure 4:
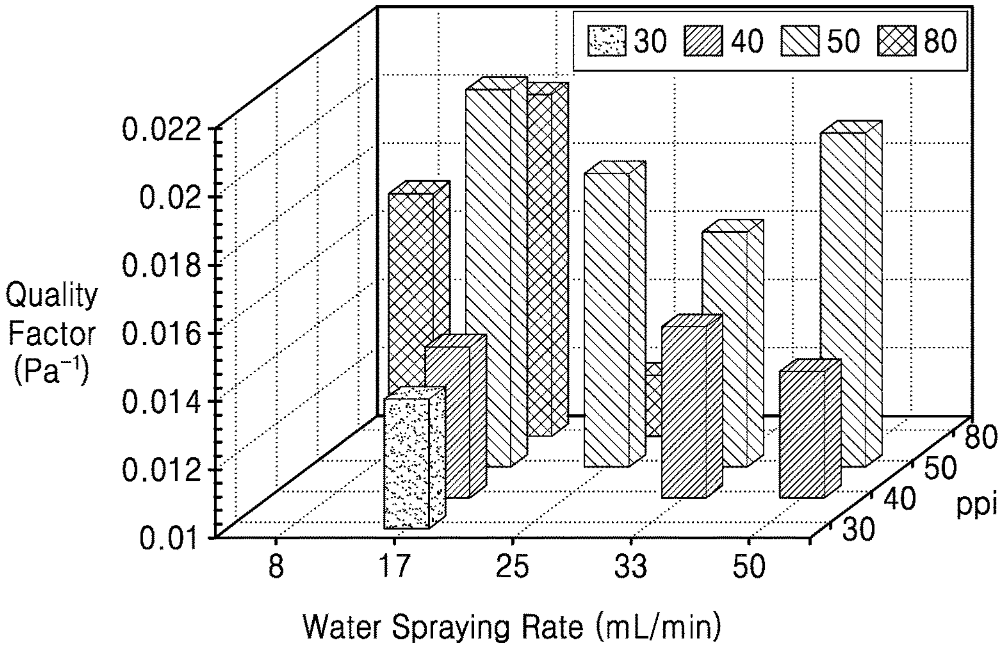
FIG. 4 is a graph showing a change in a quality factor according to a droplet spraying rate and the size of a pore.

When the ultrasonic droplet sprayer 2 is employed, as the sizes of fine droplets are substantially uniform, the droplet spraying rate and the sizes of the pores 32 of the gas-liquid contact layer 31 may affect the fine dust removal rate and the differential pressure performance. Table 1 shows a result of measuring a differential pressure according to the droplet spraying rate and the sizes of the pores 32. The differential pressure is indicated in the form of "wet differential pressure (dry differential pressure)". Table 2 shows a result of measuring a fine dust removal rate according to the droplet spraying rate and the sizes of the pores 32. FIG. 4 is a graph showing a change in QF according to the droplet spraying rate and the size of a pore.

For measurement, nickel foam blocks, respectively having a thickness of 6 mm and with the pores 32 having a size (or cell density) of 30, 40, 50, and 80 ppi, are alternately installed, as the gas-liquid contact layer 31, in the duct 1 having a cross-sectional size of 10 cm×10 cm. The ultrasonic droplet sprayer 2 is employed as a droplet sprayer. The droplet spraying rate of the ultrasonic droplet sprayer 2 is adjusted to be 8, 17, 25, 33, and 50 mL/min. A fine dust removal rate is calculated by measuring a particle concentration in each of the upstream and the downstream of the gas-liquid contact layer 31 while supplying air including potassium chloride particles of PM2.5, as fine dust, to the duct 1 at a speed of 2.5 m/s, and a differential pressure is calculated by measuring a pressure in the upstream and the downstream of the gas-liquid contact layer 31. QF may be calculated by Equation 1 described above, as shown in FIG. 4.

TABLE 1

| Size of Pore | Droplet Spraying Rate (mL/min) | | | | |
|---|---|---|---|---|---|
| (ppi) | 8 | 17 | 25 | 33 | 50 |
| 30 | — | 79.4 (21) | — | — | — |
| 40 | — | 129 (33) | — | 145.9 (33) | 154.3 (33) |
| 50 | — | 154.3 (57) | 192.9 (57) | 195.3 (57) | 180.9 (57) |
| 80 | 170.2 (95) | 259.6 (95) | 436 (95) | — | — |

TABLE 2

| Size of Pore | Droplet Spraying Rate (mL/min) | | | | |
|---|---|---|---|---|---|
| (ppi) | 8 | 17 | 25 | 33 | 50 |
| 30 | — | 66.6% | — | — | — |
| 40 | — | 84.6% | — | 88.8% | 87.9% |
| 50 | — | 96.1% | 97.2% | 96.3% | 97.2% |
| 80 | 94.5% | 99.4% | 99.4% | — | — |

Referring to Tables 1 and 2, as the sizes of the pores 32 decrease and also the droplet spraying rate increases, the fine dust removal rate increases, but the differential pressure increases as well so that the energy consumption of the system increases. Accordingly, in terms of QF for evaluating the fine dust removal rate per unit differential pressure increase, it is desired to determine an optimal range of the droplet spraying rate and/or the sizes of the pores 32. For example, referring to FIG. 4, when the sizes of the pores 32 are 50 ppi to 80 ppi, a high QF is obtained for a droplet spraying rate of 17 mL/min or more. In the experiment, the droplet spraying rate of 17 mL/min corresponds to a liquid-to-gas ratio of about 0.011 L/$m^3$. Accordingly, in an embodiment, the size of the pores 32 may be in a range of 50 ppi to 80 ppi, and the droplet spraying rate of the ultrasonic droplet sprayer 2 may be a liquid-to-gas ratio in a range of about 0.01 mL/$m^3$ to about 0.1 mL/$m^3$.

Figure 5:
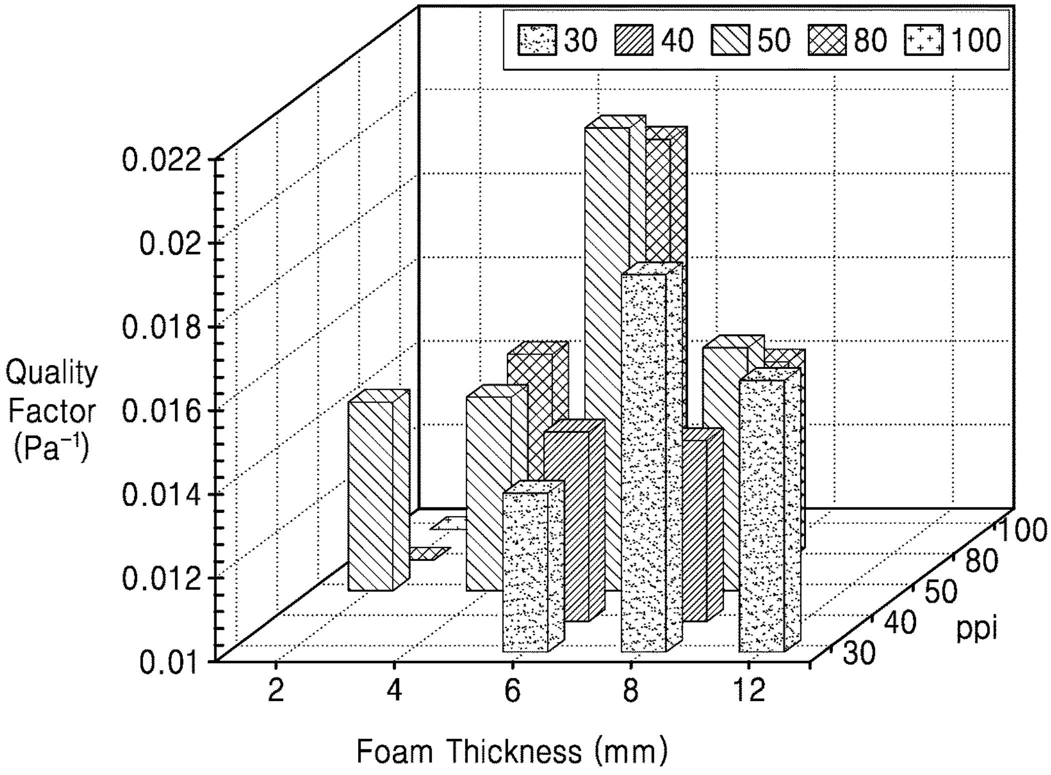
FIG. 5 is a graph showing a change in a quality factor according to a thickness of a gas-liquid contact layer and a size of a pore.

Next, the effects of the thickness of the gas-liquid contact layer 31 and the sizes of the pores 32 on the fine dust removal rate and the differential pressure will be described. Table 3 shows a result of measuring a differential pressure according to the thickness of the gas-liquid contact layer 31 and the sizes of the pores 32. The differential pressure is indicated in the form of "wet differential pressure (dry differential pressure)". Table 4 shows a result of measuring a fine dust removal rate according to the thickness of the gas-liquid contact layer 31 and the sizes of the pores 32. FIG. 5 is a graph showing a change in QF according to the thickness of the gas-liquid contact layer 31 and the sizes of the pores 32.

For measurement, the droplet spraying rate of the ultrasonic droplet sprayer 2 is fixed to 17 mL/min. The cross-sectional size of the duct 1 is 10 cm×10 cm. Nickel foam blocks having thicknesses of 2, 4, 6, 8, and 12 mm with the pores 32 having sizes of 30, 40, 50, 80, and 100 ppi are alternately installed as the gas-liquid contact layer 31 in the duct 1. The droplet spraying rate of the ultrasonic droplet sprayer 2 is fixed to 17 mL/min. A fine dust removal rate is calculated by measuring a particle concentration in each of the upstream and the downstream of the gas-liquid contact layer 31 while supplying air including potassium chloride particles of PM2.5, as fine dust, to the duct 1 at a speed of 2.5 m/s, and a differential pressure is calculated by measuring a pressure in the upstream and the downstream of the gas-liquid contact layer 31. QF may be calculated by Equation 1 described above, as shown in FIG. 5.

TABLE 3

| Size of Pore (ppi) | Thickness of Nickel Foam Block (mm) | | | | |
|---|---|---|---|---|---|
| | 2 | 4 | 6 | 8 | 12 |
| 30 | — | — | 79.4 (21) | 81.9 (30) | 180.4 (43) |
| 40 | — | — | 129 (33) | 238.6 (41) | — |
| 50 | 171.2 (22) | 231.9 (48) | 154.3 (57) | 312.8 (95) | — |
| 80 | 391.2 (43) | 368.9 (76) | 259.6 (95) | 477.2 (151) | — |
| 100 | 363.7 (44) | — | — | — | — |

TABLE 4

| Size of Pore | Thickness of Nickel Foam Block (mm) | | | | |
|---|---|---|---|---|---|
| (ppi) | 2 | 4 | 6 | 8 | 12 |
| 30 | — | — | 66.6% | 78.9% | 94.9% |
| 40 | — | — | 84.6% | 96.7% | — |
| 50 | 91.7% | 96.6% | 96.1% | 99.3% | — |
| 80 | 94.6% | 99.6% | 99.4% | 99.9% | — |
| 100 | 96.8% | — | — | — | — |

Referring to Tables 3 and 4, as the sizes of the pores 32 decrease and also the thickness of the gas-liquid contact layer 31 increases, the fine dust removal rate increases, but the differential pressure increases as well so that the energy consumption of the system increases. Accordingly, in terms of QF for evaluating the fine dust removal rate per unit differential pressure increase, it is desired to determine an optimal range of the thickness of the gas-liquid contact layer 31 and/or the sizes of the pores 32. For example, referring to FIG. 5, when the sizes of the pores 32 are 50 ppi to 80 ppi, a high QF is obtained for the gas-liquid contact layer 31 having a thickness in a range of 2 mm to 12 mm. Furthermore, the thickness of the gas-liquid contact layer 31 shows a high QF when in a range of about 6 mm to about 8 mm. In the experiment, the droplet spraying rate of 17 mL/min corresponds to the liquid-to-gas ratio of about 0.011 L/$m^3$. Accordingly, in an embodiment, the sizes of the pores 32 may be in a range of 50 ppi to 80 ppi, the droplet spraying rate of the ultrasonic droplet sprayer 2 may be a liquid-to-gas ratio in a range of about 0.01 mL/$m^3$ to about 0.1 mL/$m^3$, and the thickness of the gas-liquid contact layer 31 may be in a range of about 6 mm to about 8 mm.

In an embodiment, the porous foam member 311 may be treated to have a non-affinity to liquid to easily separate droplets from the collection surface of the fine flow path. Accordingly, the collection surface of the fine flow path formed by the porous foam member 311 has a non-affinity to liquid, and thus, the liquid may be easily separated from the collection surface of the fine flow path. In an embodiment, for example, the porous foam member 311 may be treated to be hydrophobic. In an embodiment, for example, the porous foam member 311 may be nickel foam. The porous foam member 311 may be hydrophobically treated nickel foam. For example, the hydrophobic treatment may be performed by the following process. Nickel foam having a certain thickness is prepared. The nickel foam is impregnated in 2.5 mol/L NaOH solution at 80 °C for one hour to remove impurities on a surface of the nickel foam. Next, 1 wt % of PFOTES (1H, 1H,2H,2H-Perfluoro-octyltriethoxysilane, Sigma-aldrich) is added to a 2:8 of ethanol:water mixture and stirred for one hour. The nickel foam is cut to an appropriate size and impregnated in a solution for one hour and then dried in the air for one hour. The dried nickel foam is dried in an oven at 120 °C for one hour to remove a remaining solvent.

Referring back to FIG. 2, in an embodiment, the gas-liquid contact layer 31 may further include a mesh screen 312. The mesh screen 312 may be installed in each of the inlet 331 and the outlet 332 of the housing 33. The porous foam member 311 may be located between a pair of mesh screens 312. The mesh screen 312 may be treated to have a non-affinity to liquid. Accordingly, pores of the mesh screen 312 may not be clogged by the liquid, and the differential pressure performance may be improved. The mesh screen 312 may include, for example, a metal mesh screen. A hydrophobic treatment method of the mesh screen 312 may be the same as the hydrophobic treatment method of the nickel foam block described above.

Figure 6:
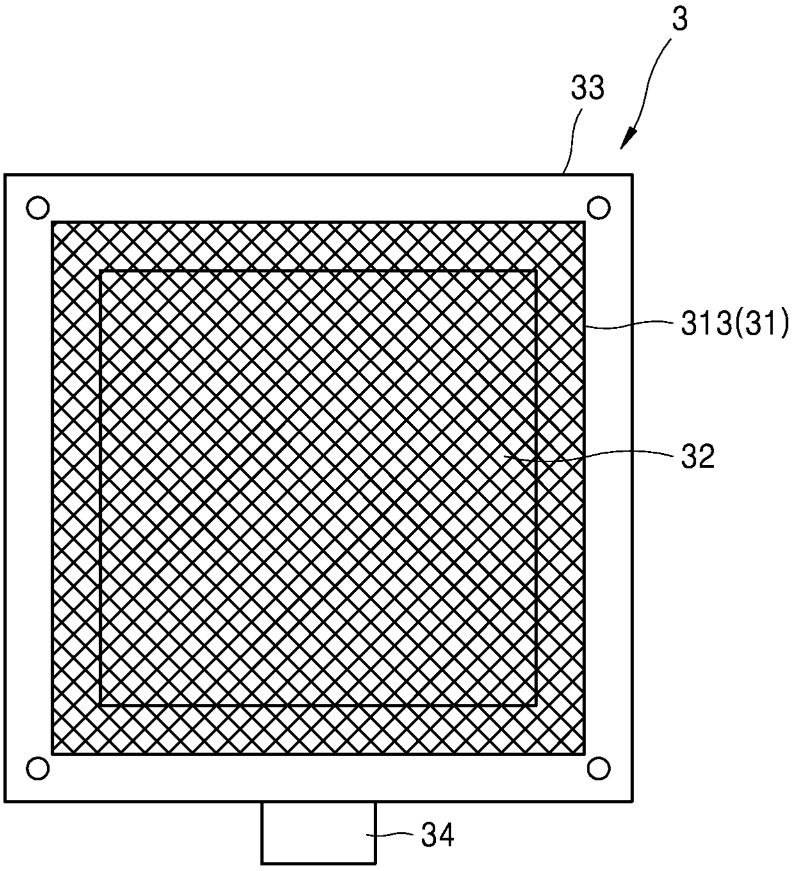
FIG. 6 is a front view of the dust collector according to an embodiment.

FIG. 6 is a front view of the dust collector 3 according to an embodiment.

Referring to FIG. 6, an embodiment of the gas-liquid contact layer 31 may include a mesh screen 313 having a plurality of grid-type pores 32. In an embodiment, for example, a plurality of mesh screens 313 may be supported on the housing 33 to overlap each other in the air flow direction. The mesh screen 313 may include a metal mesh screen. The gas-liquid mixed fluid passes through a fine flow path formed by the mesh screen 313. In this process, droplets are collected on the collection surface of the fine flow path. The droplets fall in the direction of gravity. In an embodiment, the mesh screen 313 may be treated to have a non-affinity to the droplets to easily separate the droplets from the collection surface of the fine flow path, that is, the mesh screen 313. In an embodiment, for example, the mesh screen 313 may be hydrophobically treated. The mesh screen 313 may include, for example, a metal mesh screen. The hydrophobic treatment method of the mesh screen 313 may be identical to the hydrophobic treatment method of the nickel foam block described above.

Figure 7:
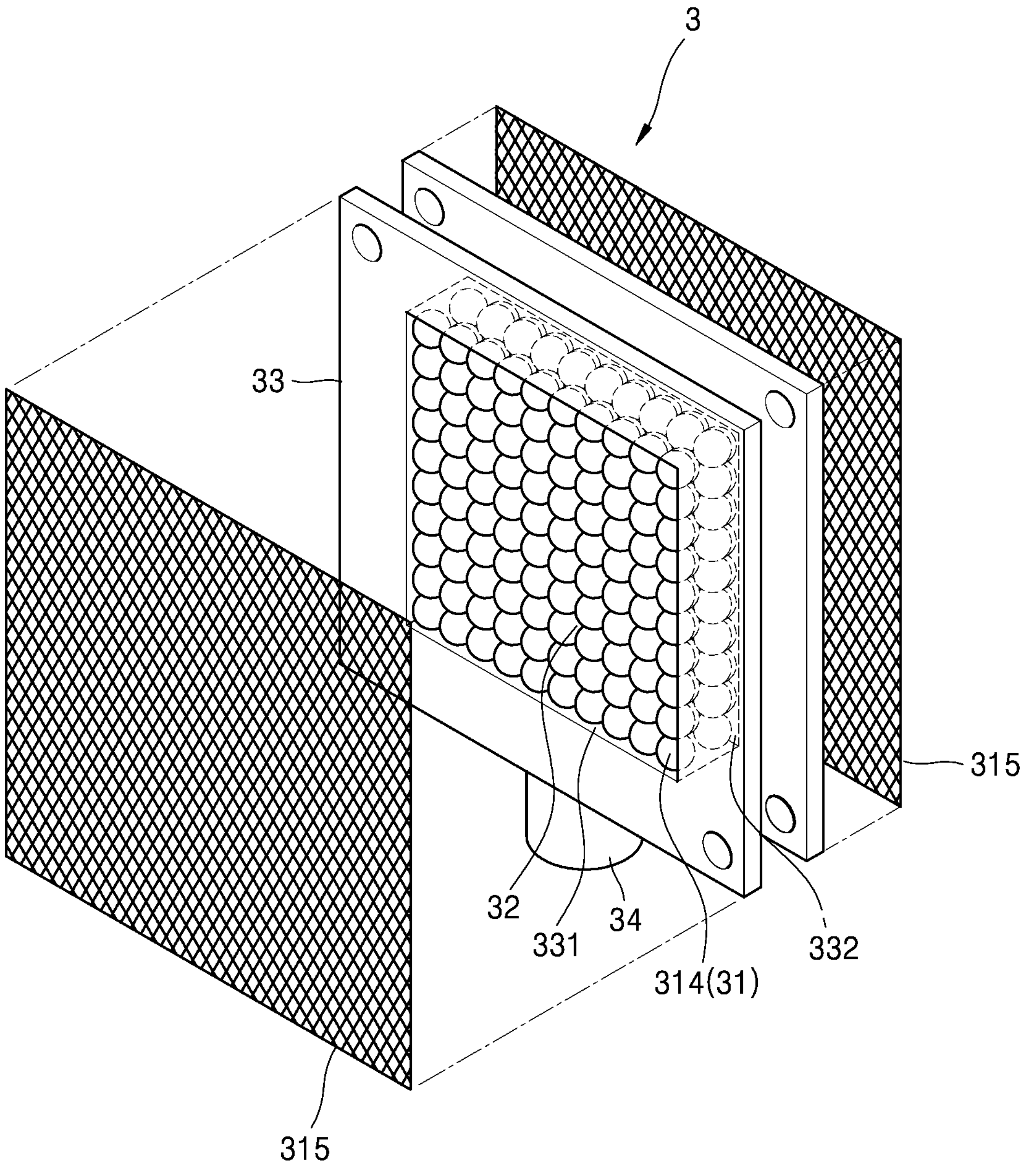
FIG. 7 is a schematic exploded perspective view of the dust collector of FIG. 6.

FIG. 7 is a schematic exploded perspective view of the dust collector 3 according to an embodiment.

Referring to FIG. 7, an embodiment of the gas-liquid contact layer 31 may include a plurality of filling particles 314 packaged in the housing 33. A fine flow path is formed by the pores 32 defined between the filling particles 314. A liquid film is formed on surfaces of the filling particles 314 and a collection surface for collecting fine dust is formed. The discharge outlet 34 through which the liquid and the fine dust collected in the surface of the filling particles 314 are discharged is provided in the housing 33. The housing 33 may include an inlet 331 through which a gas-liquid mixed fluid including droplets is introduced and an outlet 332 through which the gas-liquid mixed fluid is discharged.

Filling particles 314 may include, for example, beads. The beads may include or be formed of, for example, glass, metal, or the like. The diameters of the beads may be regular or irregular. The beads may be regularly or irregularly packed inside the housing 33. The beads may be stacked in one or more layers in a flow direction of the gas-liquid mixed fluid. The fine flow path may be formed by the pores 32 between the beads. In an embodiment, for example, the beads may include a plurality of spherical beads. The sizes of the spherical beads may be identical to each other. The sizes of the spherical beads may be irregular. The spherical beads may be packed inside the housing 33 in various shapes. The packing shape of the beads may be various, for example, centered cubic structures such as a primitive centered cubic (PCC) structure, a face centered cubic (FCC) structure, a body centered cubic (BCC) structure, a hexagonal closed-packed (HCP) structure, or the like. The porosity of the PCC structure is about 48.6%. The porosity of the FCC structure is about 26%. The porosity of the BCC structure is about 32%. The fine flow path may be defined by at least three beads adjacent to one another. To increase a contact probability between the gas-liquid mixed fluid and the beads while passing through the fine flow path, the beads may be stacked in at least two layers. The cross-sectional area of the fine flow path between the inlet 331 and the outlet 332 repeats contraction and expansion at least one or more times in the flow direction of the gas-liquid mixed fluid. Accordingly, the contact probability between the gas-liquid mixed fluid and the beads increases, and thus, a fine dust collection efficiency may be improved. The beads are not limited to the spherical beads. The beads may include irregular beads. The filling particles 314 may include a plurality of raschig rings. The raschig rings may be packed inside regularly or irregularly the housing 33.

In such an embodiment, the gas-liquid mixed fluid passes through the pores 32 formed between the filling particles 314. In this process, the droplets are collected in the surfaces of the filling particles 314. The droplets fall in the direction of gravity. In an embodiment, the surfaces of the filling particles 314 may be treated to have a non-affinity to the droplets to easily separate the droplets from the surfaces of the filling particles 314. In an embodiment, for example, the surfaces of the filling particles 314 may be hydrophobically treated.

A screen 315 may be disposed at each of the inlet 331 and the outlet 332 of the housing 33. Accordingly, the filling particles 314 are located between a pair of mesh screens 315. The mesh screen 315 may be treated to have a non-affinity to liquid (e.g., hydrophobic treatment). Accordingly, the pores of the mesh screen 315 may be effectively prevented from being clogged by the liquid, and a differential pressure may be reduced. The mesh screen 315 may include, for example, a metal mesh screen. The hydrophobic treatment method of the mesh screen 315 may be the same as the hydrophobic treatment method of the nickel foam block described above.

The air introduced into the duct 1 may include not only particulate pollutants such as fine dust or the like, but also gaseous pollutants, such as a water-soluble organic compound $VOC_{sol}$, an insoluble organic compound $VOC_{insol}$, other harmful gases, and the like. As an example, fine dust PM may include small fine dust with a diameter of 10 μm or less and ultra-fine dust with a diameter of 2.5 μm or less. Furthermore, the water-soluble organic compound $VOC_{sol}$, as a volatile organic compound, may include a gas material, for example, ammonia ($NH_3$), acetaldehyde ($CH_3CHO$), acetic acid ($CH_3COOH$), which may be collected in water or an aqueous solution and removed. Furthermore, the insoluble organic compound $VOC_{insol}$, as a volatile organic compound that is not collected in water or an aqueous solution, may include, for example, benzene ($C_6H_6$), formaldehyde ($CH_2O$), toluene ($C_6H_5CH_3$), or the like. However, the disclosure is not limited thereto, and the air introduced into the duct 1 may include any gas other than the fine dust, the water-soluble organic compound $VOC_{sol}$, and the insoluble organic compound $VOC_{insol}$.

The particulate pollutants including the fine dust may be removed by the ultrasonic droplet sprayer 2 and the dust collector 3 described above. The air purifier may have a structure to remove gaseous pollutants, such as the water-soluble organic compound $VOC_{sol}$, the insoluble organic compound $VOC_{insol}$, and the like.

Figure 8:
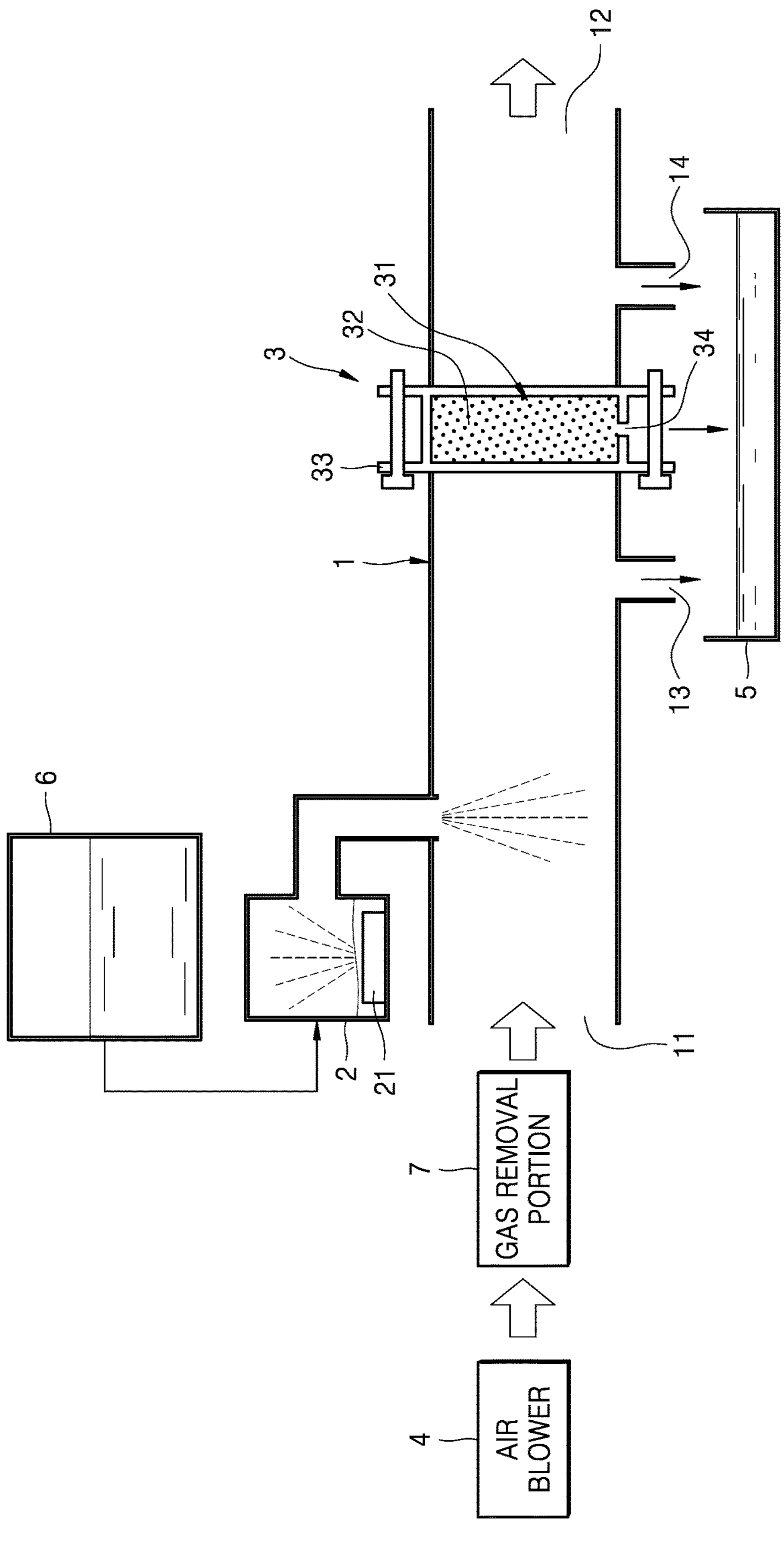
FIG. 8 is a schematic configuration view of an air purifier according to an embodiment.

FIG. 8 is a schematic configuration view of an air purifier according to an embodiment. The air purifier according to an embodiment of FIG. 8 is substantially the same as the air purifiers according to the embodiments described above except that the air purifier further includes a gas removal portion 7. Accordingly, the elements described above are indicated by the same reference numerals and any repetitive detailed descriptions thereof will be omitted, and differences between the embodiments are mainly described.

Referring to FIG. 8, the air purifier according to an embodiment may further include the gas removal portion 7 that removes gaseous pollutants from the air. The gas removal portion 7 may be located in the upstream side of the ultrasonic droplet sprayer 2. The gas removal portion 7 may be arranged inside the duct 1, in particular, in the upstream side of the inlet 11 of the duct 1 to supply air from which gaseous pollutants are removed into the duct 1 through the inlet 11 of the duct 1. In an embodiment, the gas removal portion 7 may decompose and remove the gaseous pollutants by using plasma discharge. In an embodiment, the gas removal portion 7 may decompose and remove the gaseous pollutants by using a photocatalyst reaction.

Figure 9:
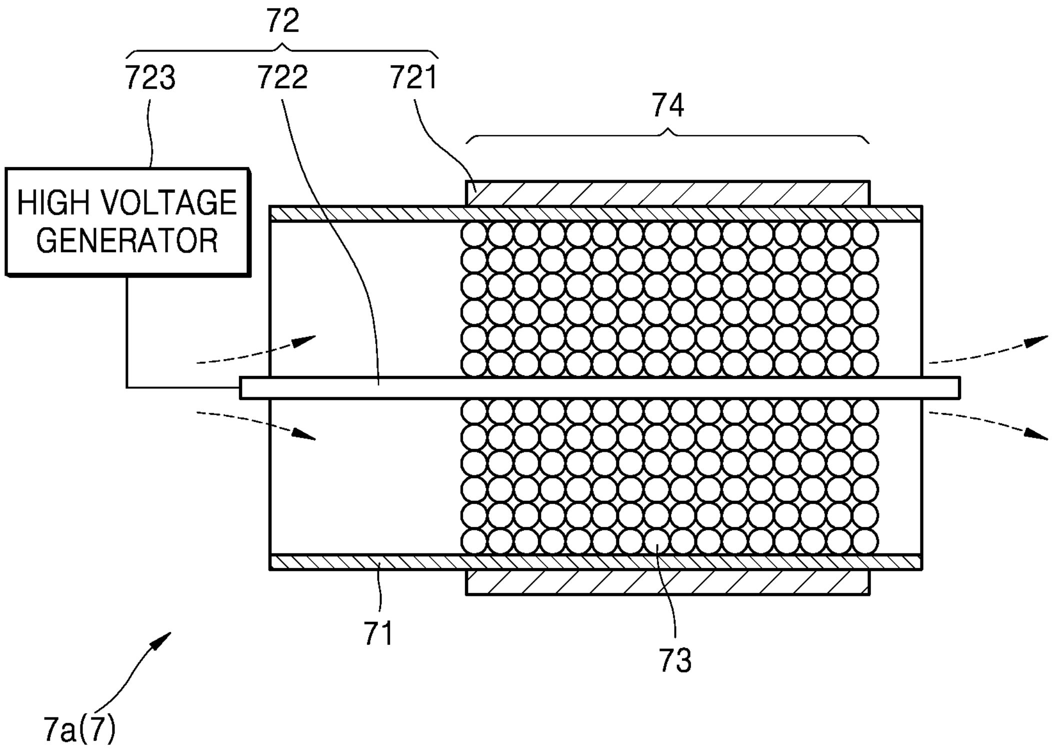
FIG. 9 is a schematic configuration view of a gas removal portion according to an embodiment.

FIG. 9 is a schematic configuration view of the gas removal portion 7 according to an embodiment.

Referring to FIG. 9, the gas removal portion 7 according to an embodiment may include a plasma reaction device 7a that removes gaseous pollutants by using plasma discharge. The plasma reaction device 7a may include a reactor 71, a discharge plasma generator 72, and a plurality of dielectric particles 73 arranged in the reactor 71.

The reactor 71 forms a flow path of air subject to purification. A discharge area 74 is provided inside the reactor 71 in which discharge plasma is generated. In an embodiment, for example, the reactor 71 may be a hollow barrel. In an embodiment, for example, the reactor 71 may be a glass conduit or an aluminum conduit. The dielectric particles 73 are arranged in the discharge area 74 in the reactor 71.

The discharge plasma generator 72 applies an electric field to the discharge area 74 to form discharge plasma. The discharge plasma generator 72 may include a first electrode 721 and a second electrode 722, and a high voltage generator 723. The first electrode 721 is arranged on an outer wall of the reactor 71, and the second electrode 722 is arranged inside the reactor 71 to face the first electrode 721. In an embodiment, for example, the first electrode 721 may surround the outer wall of the reactor 71. The discharge area 74 may be defined by the first electrode 721 inside the reactor 71. In an embodiment where the reactor 71 is a conductor, the first electrode 721 may be integrated with the reactor 71. In an embodiment where the reactor 71 is a non-conductor, the first electrode 721 may be implemented by a silver paste film surrounding the outer wall of the reactor 71. The second electrode 722 may be arranged inside the discharge area 74 to be apart from the first electrode 721 by a certain distance. In an embodiment, for example, the second electrode 722 may be implemented by a steel wire extending in the longitudinal direction of the reactor 71. In an embodiment, the first electrode 721 may include a ground electrode, and the second electrode 722 may include a power electrode. The high voltage generator 723 applies a high frequency voltage to the second electrode 722. In an embodiment, the high voltage generator 723 may include a sinusoidal wave alternate current (AC) power supplier and a transformer. In an embodiment, for example, the high voltage generator 723 may apply, to the discharge area 74, a high frequency voltage of 2 kilovolts (kV) to 500 kV having a frequency of 10 hertz (Hz) to 1000 Hz. In the discharge area 74, a separation distance between the first electrode 721 and the second electrode 722 may be in a range of 10 mm to 100 mm. Accordingly, an electric field of 2 kV/cm to 5 kV/cm may be applied to the discharge area 74.

The dielectric particles 73 are charged in the discharge area 74. The dielectric particles 73 may include a dielectric material that can be polarized within the discharge plasma generated in the discharge area 74 by the discharge plasma generator 72. As an example, the dielectric particles 73 may include a metal oxide or a metal nitride, for example, at least one selected from a silicon oxide, a boron oxide, an aluminum oxide, a manganese oxide, a titanium oxide, a barium oxide, a copper oxide, a magnesium oxide, a zinc oxide, a zirconium oxide, a yttrium oxide, a calcium oxide, a nickel oxide, and an iron oxide, or one or more of mixtures of the materials. The dielectric particles 73 may have a shape to form pores to increase the time for the polluted air to stay inside the reactor 71. In an embodiment, for example, the dielectric particles 73 may include spherical beads, each having a certain diameter of particle, for example, an average particle diameter of 1 mm to 20 mm. The dielectric particles 73 may have a certain three-dimensional shape.

The plasma reaction device 7a may decompose the water-soluble organic compound $VOC_{sol}$. When a high frequency voltage is applied to the second electrode 722, oxygen ($O_2$) and water molecules ($H_2O$) in the air around the second electrode 722 are broken down into a neutral gas ion body state (plasma state) and OH radicals (OH·) may be generated. Accordingly, the water-soluble organic compound $VOC_{sol}$, such as, acetic acid ($CH_3COOH$), acetaldehyde ($CH_3CHO$), methane ($CH_4$), and the like, may react with OH radicals (OH·) and oxygen ($O_2$) to be decomposed into carbon dioxide ($CO_2$) and water ($H_2O$). The carbon dioxide ($CO_2$) and the water ($H_2O$) that are decomposition products may be discharged outside the reactor 71. The insoluble organic compound $VOC_{insol}$ may be decomposed by the plasma reaction device 7a. When a high frequency voltage is applied to the second electrode 722, oxygen ($O_2$) and water molecules ($H_2O$) in the air around the second electrode 722 are broken down into a neutral gas ion body state (plasma state), and OH radicals (OH·) may be generated. In an embodiment, for example, organic toluene ($C_6H_5CH_3$) may be decomposed by OH radicals (OH·) into carbon dioxide ($CO_2$) and water ($H_2O$). The carbon dioxide ($CO_2$) and the water ($H_2O$) that are decomposition products may be discharged outside the reactor 71.

In an embodiment, as described above, the gaseous pollutants in the air that has passed through the reactor 71 may be removed by the plasma reaction device 7a using discharge plasma. The air from which the gaseous pollutants are removed are supplied toward the ultrasonic droplet sprayer 2 and the dust collector 3 through the duct 1. Among the gaseous pollutants included in the air, the water-soluble organic compound $VOC_{sol}$ may be collected and removed by the fine droplets provided by the ultrasonic droplet sprayer 2 and the liquid film formed on the collection surface of the dust collector 3. Furthermore, ozone generated in the decomposition process of the plasma reaction device 7a may be removed by being solved in the fine droplets provided by the ultrasonic droplet sprayer 2 and the liquid film formed on the collection surface of the dust collector 3.

Although it is not illustrated in the drawings, the gas removal portion 7 may be implemented by a photocatalyst device. In an embodiment, for example, the photocatalyst device may include a support, a photocatalyst layer on the support, and a light source that provides optical energy to the photocatalyst layer. The support may have a filter structure for partially removing particulate pollutants. The photocatalyst layer may include a material that receives optical energy to cause a photocatalyst reaction. In an embodiment, for example, the photocatalyst layer may include a metal compound, such as $TiO_2$, $WO_3$, and the like, which causes the photocatalyst reaction. The light source may provide ultraviolet energy, visible light energy, or the like to the photocatalyst layer. The gaseous pollutants, such as a volatile organic compound (VOC), for example, formaldehyde, acetaldehyde, ammonia, toluene, acetic acid, or the like, or other harmful gas and the like, which are included in the air, contact the photocatalyst layer while passing through the photocatalyst device. While passing through the photocatalyst layer, the gaseous pollutants cause a catalyst reaction (e.g., when optical energy is supplied, reacting with oxygen) and may be decomposed.

In the air purifiers according to embodiments described above, the amount of water consumed in the purification process may be reduced by forming fine droplets of a uniform size by using an ultrasonic droplet sprayer. In such embodiments, an air purifier capable of purifying the air using less energy may be implement.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be understood by those of ordinary skill in the art that various changes in form and details may be made therein without departing from the spirit or scope of the invention as defined by the following claims.

What is claimed is:

1. An air purifier comprising:

a duct through which air including particulate dust flows;

an ultrasonic droplet sprayer which sprays droplets into the duct by using an ultrasonic vibrator to form a gas-liquid mixed fluid including the particulate dust, wherein a droplet spraying rate of the ultrasonic droplet sprayer satisfies a liquid-to-gas ratio in a range of about 0.01 $L/m^3$ to about 0.1 $L/m^3$; and a dust collector which collects the particulate dust in the gas-liquid mixed fluid, wherein the dust collector includes a gas-liquid contact layer having a plurality of pores through which the gas-liquid mixed fluid passes.

2. The air purifier of claim 1, wherein a size of each of the fine droplets is about 50 μm or less.

3. The air purifier of claim 1, wherein a size of each of the plurality of pores is in a range of about 50 ppi to about 80 ppi.

4. The air purifier of claim 1, wherein a thickness of the gas-liquid contact layer is in a range of about 6 mm to about 8 mm.

5. The air purifier of claim 1, wherein the gas-liquid contact layer comprises a porous foam member.

6. The air purifier of claim 5, wherein a size of each of the plurality of pores is in a range of about 50 ppi to about 80 ppi.

7. The air purifier of claim 5, wherein a thickness of the porous foam member is in a range of about 6 mm to about 8 mm.

8. The air purifier of claim 5, wherein the porous foam member is hydrophobically treated.

9. The air purifier of claim 1, wherein the gas-liquid contact layer comprises a housing and a plurality of filling particles filled in the housing.

10. The air purifier of claim 9, wherein the plurality of filling particles are hydrophobically treated.

11. The air purifier of claim 9, wherein the housing is provided with an inlet through which the gas-liquid mixed fluid is introduced and an outlet through which the gas-liquid mixed fluid is discharged, and a mesh screen is arranged in each of the inlet and the outlet.

12. The air purifier of claim 11, wherein the mesh screen is hydrophobically treated.

13. The air purifier of claim 1, further comprising:

a gas removal portion arranged in an upstream side of the ultrasonic droplet sprayer, wherein the gas removal portion removes gaseous pollutants from air.

14. An air purifier comprising:

a duct through which air including pollutants flows;

an ultrasonic droplet sprayer which sprays droplets into the duct by using an ultrasonic vibrator to form a gas-liquid mixed fluid including the pollutants, wherein a droplet spraying rate of the ultrasonic droplet sprayer satisfies a liquid-to-gas ratio in a range of about 0.01 $L/m^3$ to about 0.1 $L/m^3$; and a porous foam member having a plurality of pores through which the gas-liquid mixed fluid passes, wherein a liquid film is formed on a collection surface defined by the plurality of pores to collect the pollutants in the gas-liquid mixed fluid.

15. The air purifier of claim 14, wherein a size of each of the plurality of pores is in a range of about 50 ppi to about 80 ppi.

16. The air purifier of claim 15, wherein a thickness of the porous foam member is in a range of about 6 mm to about 8 mm.

17. The air purifier of claim 14, wherein the porous foam member is hydrophobically treated.

18. The air purifier of claim 14, further comprising:

a gas removal portion arranged in an upstream side of the ultrasonic droplet sprayer, wherein the gas removal portion removes gaseous pollutants from air.

* * * * *